July 25, 1933.  J. C. McCUNE  1,919,442
FLUID PRESSURE BRAKE
Filed Jan. 2, 1930
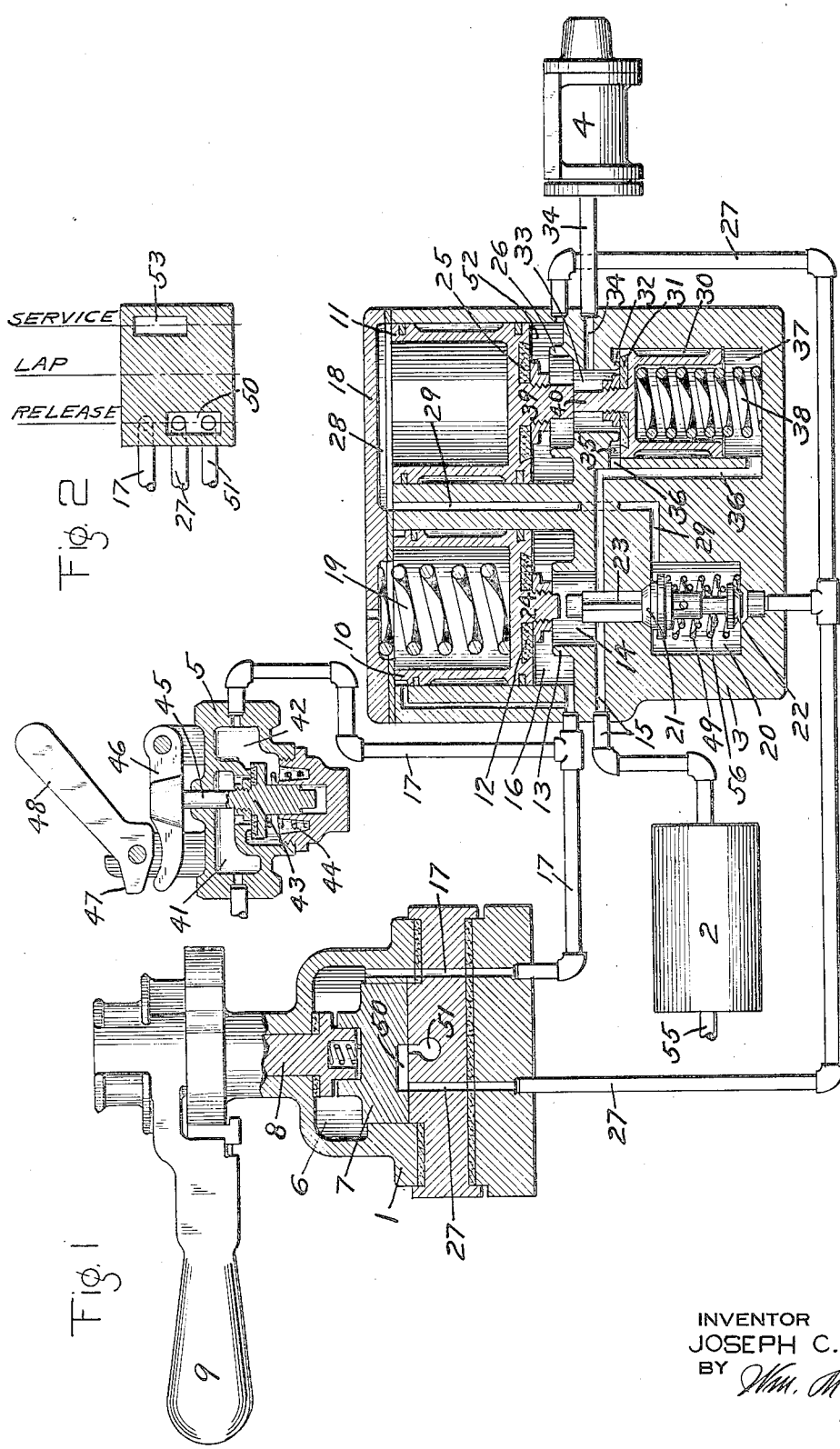
INVENTOR
JOSEPH C. McCUNE
BY Wm. M. Cady
ATTORNEY Patented July 25, 1933

1,919,442

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed January 2, 1930. Serial No. 417,874.

This invention relates to fluid pressure brake equipments for vehicles.

It may sometimes happen that the pressure of fluid stored in the main reservoir of a fluid pressure brake system will be reduced below a safe point, i. e., to a point where the pressure is inadequate to control the brakes, without the operator being aware of the fact until he attempts to effect an application of the brakes.

The principal object of my invention is to provide a fluid pressure brake system embodying means for automatically effecting an application of the brakes in the event of the pressure of fluid, in the main reservoir or other supply source, being reduced to a predetermined dangerous degree below that normally carried.

It may also happen that the brake valve device, which in some systems comprises a complicated mechanism, may fail to function to effect an application of the brakes, and it is another object of my invention to provide my improved brake system with manually operative means, separate from the brake valve device, for reducing the pressure of fluid in the main reservoir to a predetermined point below that normally carried, for effecting an application of the brakes.

Other objects and advantages will appear in the following detailed description of my invention.

In the accompanying drawing; Figure 1 is a diagrammatic view, partly in section, of a fluid pressure brake system embodying my invention, the brake valve device being shown in release position and the other parts of the system being shown in their normal positions with the system fully charged; and Fig. 2 is a development view of the brake valve device.

As shown in the drawing, the fluid pressure brake system may comprise a brake valve device 1, a main reservoir 2, a cut-off valve device 3, a brake cylinder 4, and a hand operated brake controlling valve device 5.

The brake valve device 1 may comprise a casing having a chamber 6 containing a rotary valve 7 having an operating stem 8 on which there is mounted the usual operating handle 9.

The cut-off valve device 3 may comprise a casing having a cylindrical bore in which is mounted a valve piston 10, and also having a cylindrical bore in which is mounted a valve piston 11.

The valve piston 10 is provided, at one end, with a seat portion or gasket 12 adapted to engage an annular seat rib 13. The chamber 14 within the seat rib 13 is constantly connected with the usual main reservoir 2 through a passage and pipe 15, the space or chamber 16 outside of the seat rib being constantly connected with rotary valve chamber in the brake valve device 1 through a pipe and passage 17.

The open ends of the cylindrical bores, containing the valve pistons 10 and 11, are closed by a cover plate 18, which is secured to the casing in any desired manner, and interposed between and engaging this cover plate and an upper surface of the valve piston 10, is a coil spring 19, the pressure of which tends, at all times, to operate the piston toward its seat rib 13.

Contained in a chamber 20 in the casing are valves 21 and 22, which are loosely connected together to permit the valve 21 to move relative to the valve 22, as will hereinafter be more fully described.

The valve 21 is provided with a fluted stem 23 which extends through a wall of the casing and which, at its end, is adapted to be operatively engaged by a projection 24 carried by the valve piston 10.

The valve piston 11 is provided, at one end, with a seat portion or gasket 25 adapted to engage an annular seat rib 26. The chamber or space 52 on the outside of the seat rib 26 is constantly connected to a pipe 27 which leads to the seat of the rotary valve 7 of the brake valve device, and the chamber 28, at the other side of the valve piston, is constantly connected with the valve chamber 20 through a passage 29.

Also mounted in the casing, below the valve piston 11, is a valve piston 30 which, at one end, is provided with a seat portion or gasket 31 adapted to engage a seat rib 32. The spaces inside of the seat ribs 26 and 32 are connected through a passage 33 to which the brake cylinder 4 is constantly connected through a pipe and passage 34. The space or chamber 35 outside of the seat rib 32, and at one side of the valve piston 30, is constantly connected to the chamber 14 through a passage 36. The chamber 37 at the other side of the piston is also connected to the chamber 14 through the passage 36.

Contained in the chamber 37, and interposed between and engaging the valve piston 30 and the casing, is a spring 38, the pressure of which tends, at all times, to seat the valve piston on its seat rib 32.

The valve piston 11 is provided with a projection 39 which is adapted to operatively engage a projection 40 carried by the valve piston 30.

The manually operated brake controlling valve device 5 may also be termed an emergency application valve device, since it is to be operated to effect an application of the brakes only in the event of the brake valve device being inoperative. This valve device may comprise a casing having a chamber 41 constantly connected to the atmosphere and having a valve chamber 42 constantly connected to the pipe 17 and containing a valve 43 which is subject to the pressure of a spring 44, said valve being operative to control the opening and closing of a communication from the chamber 42 to the chamber 41.

The valve 43 is provided with a stem 45 which extends through an opening in the casing and its end is engaged by an arm 46 hinged at one end to the casing. The other end of this arm is adapted to be operatively engaged by a cam 47 which is pivotally mounted on the casing and which is adapted to be operated manually through the medium of an operating arm or lever 48.

Assuming now that the fluid in the system is at atmospheric pressure, the pressure of the spring 19, of the cut-off valve device 3, maintains the valve piston 10 seated on its seat rib 13, the valve 21 unseated, and the valve 22 seated, and the pressure of the spring 38 maintains the valve piston 30 seated on its seat rib 32 and the valve piston 11 unseated from its seat rib 26.

Now, in initially charging the system, fluid under pressure is supplied through a pipe 55 to the main reservoir 2 and from the main reservoir is supplied to the chamber 28, at one side of the valve piston 11 through pipe and passage 15, chamber 14, past the unseated valve 21 and its fluted stem 23, through valve chamber 20 and passage 29. From the chamber 14, fluid under pressure is also supplied through passage 36 to the chamber 35, which acts on the outer seated area of the valve piston 30 and to the chamber 37 and acts on the opposite side of the valve piston.

The area of the surface of the valve piston 11 on which the pressure of fluid in the chamber 28 acts is greater than the area of the surface of the valve piston 30 on which the pressure of fluid in the chamber 37 acts, so that the pressure of fluid in the chamber 28 causes the valve pistons 11 and 30 to move downwardly against the pressure of the spring 38 and the pressure of fluid in the chamber 37, sealing the valve piston 11 against its seat rib 26 and unseating the valve piston 30 from its seat rib 32. With the valve piston 30 thus unseated, fluid under pressure flows from the chamber 35 to the brake cylinder 4 through passage 33 and passage and pipe 34, causing the brake cylinder to operate to effect an application of the brakes.

When the pressure of fluid supplied to the chamber 14 and acting on the inner seated area of the valve piston 10 is great enough to overcome the opposing pressure of the spring 19, the pressure of fluid causes the valve piston to be unseated from its seat rib 13 so that fluid under pressure is supplied from the main reservoir 2 to the rotary valve chamber 6 in the brake valve device and valve chamber 42 in the emergency application valve device 5 by way of pipe and passage 15, chamber 14, past the unseated valve piston 10, through chamber 16 and passage and pipe 17.

As the valve piston 10 is thus being operated, the pressure of a spring 49, contained in the valve chamber 20, causes the valve 21 to be seated, closing off the further supply of fluid under pressure from the chamber 14 to the chamber 28, and the valve 22 to be unseated, establishing communication from the valve chamber 20 to the pipe 27.

With the brake valve device 1 in release position as shown in Fig. 1, fluid under pressure from the chamber 28 is discharged to the atmosphere by way of passage 29, valve chamber 20, past the unseated valve 22, through pipe and passage 27, a cavity 50 in the rotary valve 7 of the brake valve device, and a passage 51.

When the chamber 28 is thus vented, the pressure of spring 38 causes the valve piston 30 to move upwardly and, due to the engagement of the projections 40 and 39, causes the valve piston 11 to move in the same direction, sealing the valve piston against it seat rib 32 and unseating the valve piston 11 from its seat rib 26.

With the valve piston 30 sealed against its seat rib 32, the further supply of fluid under pressure to the brake cylinder is cut off and with the valve piston 11 unseated from its seat rib 26, the brake cylinder is connected to the pipe 27 through pipe and passage 34, passage 33 and chamber 52 so that, if the brake valve device 1 is in release position, fluid under pressure from the brake cylinder is discharged to the atmosphere and the application of the brakes which has been effected will be released.

With the equipment thus fully charged, the several parts of the cut-off valve device will be maintained in the positions just described and shown in Fig. 1, so long as the main reservoir pressure is not reduced to a predetermined dangerously low degree, say, for instance, to 35 pounds.

When it is desired to effect an application of the brakes, the brake valve device 1 is operated to service position, in which fluid under pressure is supplied from the main reservoir 2 to the brake cylinder 4 through pipe and passage 15, chamber 14 in the cut-off valve device, past the unseated valve piston 10, through chamber 16, passage and pipe 17, chamber 6 in the brake valve device 1, a port 53 in the rotary valve 7, passage and pipe 27, chamber 52 in the cut-off valve device, past the unseated valve piston 11, through passage 33 and passage and pipe 34.

It will here be noted that, since the valve 22 is unseated, fluid under pressure supplied to the pipe 27, also flows to the chamber 28 in the cut-off valve device, but the pressure of fluid in this chamber will not cause the valve piston 11 to operate downwardly for the reason that there is an equal pressure in the chamber 52, thus balancing the valve piston. It will be further noted that since main reservoir pressure is constantly present in the chamber 37 in the cut-off valve device, the pressure of the spring 38 will maintain the valve piston 30 sealed against its seat rib 32.

To effect the release of the brakes, the brake valve device 1 is operated to release position, in which fluid under pressure in the brake cylinder 4 is vented to the atmosphere through pipe and passage 34, passage 33, chamber 52, pipe and passage 27, cavity 50 in the rotary valve 7 of the brake valve device and passage 51.

Should the pressure of fluid in the main reservoir be reduced, from the normal pressure, which may be from 55 to 65 pounds, to 35 pounds or less, the pressure of the spring 19 will cause the valve piston 10 to move downwardly and seal against its seat rib 13, and in so moving, the projection 24 on the valve piston 10, engages the stem 23 of the valve 21, causing said valve to unseat against the pressure of the spring 49. The downward movement of the valve 21 is transmitted to the valve 22 through the medium of a spring 56 interposed between and engaging the valves 21 and 22, thus seating the valve 22. After the valve 22 is seated, the loose connection between the valves permits the valve 21 to move downwardly a short distance relative to the valve 22, thus ensuring the proper sealing of the valve piston 10 against its seat rib 13.

With the valve 21 unseated and the valve 22 seated, fluid under pressure from the main reservoir 2 is supplied to the chamber 28 through pipe and passage 15, chamber 14, past the unseated valve 21, through valve chamber 20 and passage 29. Pressure of fluid thus supplied to the chamber 28 causes the valve piston 11 to move downwardly to its sealing position against its seat rib 32, thus closing communication from the brake cylinder to the pipe 27. As the valve piston 11 is thus being operated, the projection 39 thereof engages the projection 40 on the valve piston 30, and through the medium of such engagement, causes the valve piston 30 to move downwardly, against the pressure of the spring 38, from its seat rib 32, thus establishing communication through which fluid under pressure is supplied from the main reservoir to the brake cylinder, thereby effecting an application of the brakes entirely independently of the brake valve device. It will here be noted that, since the valve piston 11 is sealed against the seat rib 26, the communication from the brake cylinder to the pipe 27 is closed off, the brake valve device is rendered ineffective to release the brakes, and cannot again be rendered effective until the main reservoir pressure has been increased above 35 pounds.

Now, when the main reservoir pressure has been increased above the predetermined danger point, the cut-off valve device again operates to the position shown in Fig. 1, in which the brakes may be again normally controlled through the operation of the brake valve device 1.

Should the operator discover that the brake valve device is ineffective to cause an application of the brakes, he may, by the use of the operating lever 48 of the valve device 5, rotate the cam 47 into engagement with the free end of the hinged arm 46, causing said arm to depress the stem 45 and unseat the valve 43 against the pressure of the spring 44. With the valve 43 thus unseated, fluid under pressure from the main reservoir flows to the atmosphere through pipe and passage 15, chamber 14 in the cut-off valve device, past the unseated valve piston 10 through chamber 16, pipe 17, valve chamber 42 in the valve device 5, past the unseated exhaust valve 43 and chamber 41.

Now, when the pressure of fluid in the main reservoir 2 has been thus reduced to 35 pounds or thereabouts, the cut-off valve will operate to effect an application of the brakes in the same manner as before described.

It will be understood from the foregoing description, that when the pressure of fluid in the main reservoir is reduced to a point where it would be dangerous to operate a car, the cut-off valve device will operate automatically to effect an application of the brakes regardless of the position of the brake valve device and to also render the brake valve device ineffective to release the brakes until such time as the main reservoir pressure has been increased to a point where it would be safe to again operate the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a main reservoir and a brake cylinder, of means normally establishing communication through which fluid under pressure is supplied to and released from the brake cylinder and operative by fluid under pressure for closing said communication and for establishing another communication through which fluid under pressure is supplied to the brake cylinder, and means operated upon a predetermined reduction in fluid pressure in the main reservoir for supplying fluid under pressure to operate the first mentioned means to supply fluid under pressure to the brake cylinder.

2. In a fluid pressure brake, the combination with a main reservoir, a brake cylinder, and a brake valve device operative to normally control the application and release of the brakes, of means subject to a predetermined fluid pressure in the main reservoir for establishing communication through which fluid under pressure is supplied from the main reservoir to the brake valve device, and operative upon a predetermined reduction in fluid pressure in the main reservoir for closing said communication, valve means normally establishing communication through which fluid under pressure is supplied to and released from the brake cylinder through the medium of the brake valve device, and subject to fluid under pressure for closing the communication and for supplying fluid under pressure to the brake cylinder, and a valve operative when said means is operated to close the communication from the main reservoir to the brake valve device to supply fluid under pressure to said valve means to cause said valve means to operate to supply fluid under pressure to the brake cylinder.

3. In a fluid pressure brake, the combination with a main reservoir, a brake cylinder, and a brake valve device operative to normally control the application and release of the brakes, of valve means subject to a predetermined fluid pressure in the main reservoir for supplying fluid under pressure to the brake valve device and operative upon a predetermined reduction in fluid pressure in the main reservoir for closing off the supply of fluid under pressure to the brake valve device, pressure sensitive means normally establishing communication through which fluid under pressure is supplied to and released from the brake cylinder through the medium of the brake valve device, and operative by fluid under pressure to supply fluid under pressure to the brake cylinder, and means controlled by said valve means for supplying fluid under pressure to said pressure sensitive means to effect the operation of the pressure sensitive means to supply fluid under pressure to the brake cylinder.

4. In a fluid pressure brake, the combination with a main reservoir, a brake cylinder, and a brake valve device operative to normally control the application and release of the brakes, of valve means subject to a predetermined fluid pressure in the main reservoir for supplying fluid under pressure to the brake valve device and operative upon a predetermined reduction in fluid pressure in the main reservoir for closing off the supply of fluid under pressure to the brake valve device, pressure sensitive means normally establishing communication through which fluid under pressure is supplied to and released from the brake cylinder through the medium of the brake valve device, and operative by fluid under pressure to supply fluid under pressure to the brake cylinder, and means controlled by said valve means for supplying and releasing fluid under pressure to and from said pressure sensitive means.

5. In a fluid pressure brake, the combination with a main reservoir, a brake cylinder, and a brake valve device operative to normally control the application and release of the brakes, of valve means subject to a predetermined fluid pressure in the main reservoir for supplying fluid under pressure to the brake valve device and operative upon a predetermined reduction in fluid pressure in the main reservoir for closing off the supply of fluid under pressure to the brake valve device, pressure sensitive means normally establishing communication through which fluid under pressure is supplied to and released from the brake cylinder through the medium of the brake valve device, and operative by fluid under pressure to supply fluid under pressure to the brake cylinder, and a valve mechanism controlled by said valve means to supply fluid under pressure to the pressure sensitive means for controlling the operation of the pressure sensitive means to supply fluid under pressure to the brake cylinder.

6. In a fluid pressure brake, the combination with a main reservoir, a brake cylinder, and a brake valve device operative to normally control the brakes, of valve means subject to a predetermined fluid pressure in the main reservoir for supplying fluid under pressure to the brake valve device, and valve mechanism establishing communication through which fluid under pressure is supplied to and released from the brake cylinder by the operation of said brake valve device, said valve means being operative upon a predetermined reduction in fluid pressure in the main reservoir for closing off the supply of fluid under pressure to the brake valve device and for supplying fluid under pressure to said valve mechanism to cause said valve mechanism to operate to close said communication and to supply fluid under pressure to the brake cylinder.

7. In a fluid pressure brake equipment, the combination with a main reservoir and a brake cylinder, of valve means in initially charging the equipment establishing communication from the main reservoir to the brake cylinder to apply the brakes, and means operative upon a predetermined increase in pressure in the main reservoir for effecting the operation of said valve means to cut off said communication.

8. In a fluid pressure brake equipment, the combination with a main reservoir and a brake cylinder, of valve means in intially charging the equipment having one position for connecting the brake cylinder with the main reservoir and another position for establishing communication through which fluid is released from the brake cylinder, and means operative upon a predetermined increase in main reservoir pressure for effecting the movement of said valve means from the first mentioned position to the second mentioned position.

9. In a fluid pressure brake, the combination with a main reservoir and a brake cylinder, of valve means for initially establishing communication from the main reservoir to the brake cylinder to apply the brakes and operative by fluid under pressure for cutting off said communication, and means operative upon a predetermined increase in fluid pressure in the main reservoir for supplying fluid under pressure to said valve means.

10. In a fluid pressure brake, the combination with a main reservoir and a brake cylinder, of means normally establishing communication through which fluid under pressure is supplied to and released from the brake cylinder and operative by fluid under pressure for closing said communication and for establishing another communication through which fluid under pressure is supplied from the main reservoir to the brake cylinder, and means subject to the fluid pressure in the main reservoir to supply fluid under pressure to the first mentioned means to effect the operation of the first mentioned means to establish the last mentioned communication.

JOSEPH C. McCUNE.